(12) United States Patent
Chiang et al.

(10) Patent No.: US 11,126,134 B2
(45) Date of Patent: Sep. 21, 2021

(54) MULTI-FUNCTION PRINTER AND HINGE STRUCTURE

(71) Applicant: Kinpo Electronics, Inc., New Taipei (TW)

(72) Inventors: Shih-His Chiang, New Taipei (TW); Tzu-Cheng Chang, New Taipei (TW); Hung-Huan Sung, New Taipei (TW)

(73) Assignee: Kinpo Electronics, Inc., New Taipei (TW)

( * ) Notice: Subject to any disclaimer, the term of this patent is extended or adjusted under 35 U.S.C. 154(b) by 110 days.

(21) Appl. No.: 16/593,967

(22) Filed: Oct. 4, 2019

(65) Prior Publication Data

US 2021/0011421 A1 Jan. 14, 2021

(30) Foreign Application Priority Data

Jul. 10, 2019 (CN) .......................... 201921071908.6

(51) Int. Cl.
*G03G 21/16* (2006.01)
*F16C 11/04* (2006.01)
*B41J 29/13* (2006.01)

(52) U.S. Cl.
CPC .......... *G03G 21/1628* (2013.01); *F16C 11/04* (2013.01); *B41J 29/13* (2013.01)

(58) Field of Classification Search
CPC ....... B41J 29/13; B41J 29/02; G03G 21/1628; G03G 21/1633; G03G 2221/1654; E05D 3/18; E05D 11/10; E05D 7/0009
See application file for complete search history.

(56) References Cited

U.S. PATENT DOCUMENTS

| 6,408,161 | B1 * | 6/2002 | Minowa | H04N 1/00519 |
| | | | | 399/380 |
| 6,684,456 | B2 | 2/2004 | Lee | |
| 7,406,747 | B2 | 8/2008 | Chol | |
| 8,850,660 | B2 | 10/2014 | Kim | |
| 9,803,409 | B2 | 10/2017 | Lee | |
| 2017/0090401 | A1 * | 3/2017 | Hanamoto | G03G 21/1647 |

* cited by examiner

*Primary Examiner* — Walter L Lindsay, Jr.
*Assistant Examiner* — Jessica L Eley
(74) *Attorney, Agent, or Firm* — JCIPRNET

(57) ABSTRACT

The present invention provides a multi-function printer, including a main body, a cover, and a hinge structure. The hinge structure includes a positioning component and a pivoting member. The positioning component is connected to the main body. The pivoting member is connected to the cover and is pivotally connected to the positioning component. The pivoting member is adapted to pivot to a first state so that the cover is closed on the main body and pivot to a second state so that the cover is opened from the main body. The pivoting member includes at least one positioning portion. When the pivoting member pivots to a third state between the first state and the second state, the pivoting member is positioned to the positioning component by the at least one positioning portion.

12 Claims, 7 Drawing Sheets

MULTI-FUNCTION PRINTER AND HINGE STRUCTURE

CROSS-REFERENCE TO RELATED APPLICATION

This application claims the priority benefit of China application serial no. 201921071908.6, filed on Jul. 10, 2019. The entirety of the above-mentioned patent application is hereby incorporated by reference herein and made a part of this specification.

BACKGROUND OF THE INVENTION

1. Field of the Invention

The present invention relates to an electronic device and a hinge structure thereof, and more particularly to a multi-function printer and a hinge structure thereof.

2. Description of Related Art

With the development of technologies, various commercially available multi-function printers (MFPs) integrating functions such as photocopy and scanning have been developed to help the user with word processing tasks. To use such a multi-function printer, the user generally needs to open or close the cover to the main body. Due to its weight, the cover may be closed too fast down to the main body to hurt the user's fingers or heavily impact on the main body, causing damage to components of the multi-function printer. Therefore, the present invention provides a hinge structure to solve the above problem. The hinge structure of the present invention is not only applicable to a multi-function printer but also applicable to an electronic device having a cover and a main body.

SUMMARY OF THE INVENTION

The present invention provides a multi-function printer and the hinge structure, which can prevent the user's fingers from being hurt by the cover of an electronic device (such as the multi-function printer) and prevent the main body of the electronic device (such as the multi-function printer) from being damaged by high-speed impact of the cover.

A multi-function printer of the present invention comprises a main body, a cover, and a hinge structure. The hinge structure comprises a positioning component and a pivoting member. The positioning component is connected to the main body. The pivoting member is connected to the cover and is pivotally connected to the positioning component. The pivoting member is adapted to pivot to a first state so that the cover is closed on the main body and pivot to a second state so that the cover is opened from the main body. The pivoting member comprises at least one positioning portion, and when the pivoting member pivots to a third state between the first state and the second state, the pivoting member is positioned to the positioning component by the at least one positioning portion.

A hinge structure of the present invention is applicable to an electronic device comprising a main body and a cover. The hinge structure comprises a positioning component and a pivoting member. The positioning component is connected to the main body. The pivoting member is connected to the cover and is pivotally connected to the positioning component. The pivoting member is adapted to pivot to a first state so that the cover is closed on the main body and pivot to a second state so that the cover is opened from the main body. The pivoting member comprises at least one positioning portion, and when the pivoting member pivots to a third state between the first state and the second state, the pivoting member is positioned to the positioning component by the at least one positioning portion.

In an embodiment of the present invention, when the pivoting member pivots to the second state, the cover is opened by a first angle relative to the main body, and when the pivoting member pivots to the third state, the cover is opened by a second angle relative to the main body, wherein the second angle is smaller than the first angle.

In an embodiment of the present invention, the at least one positioning portion comprises two positioning portions, wherein when the pivoting member pivots to the third state, the pivoting member is positioned to the positioning component by one of the positioning portions, and when the pivoting member pivots to the second state, the pivoting member is positioned to the positioning component by the other positioning portion.

In an embodiment of the present invention, the positioning component comprises a base, a positioning member, and an elastic member, wherein the base is connected to the main body, the pivoting member is pivotally connected to the base, the elastic member is connected between the base and the positioning member, and the positioning member pushes against the pivoting member by an elastic force of the elastic member.

In an embodiment of the present invention, the hinge structure comprises a pivot, the base comprises a first pivot hole, the pivoting member comprises a second pivot hole, and the pivot passes through the first pivot hole and the second pivot hole to pivotally connect the pivoting member to the base.

In an embodiment of the present invention, the at least one positioning portion comprises at least one first recessed portion, the positioning member comprises a first protruding portion, and the at least one first recessed portion is adapted to be positioned to the first protruding portion.

In an embodiment of the present invention, the pivoting member comprises two second protruding portions, the first recessed portion is formed between the two second protruding portions, the positioning member comprises two guide chamfers, the first protruding portion is formed at a junction between the two guide chamfers, and each of the second protruding portions is adapted to move along one of the guide chamfers and cross the first protruding portion along with pivoting of the pivoting member, so that the at least one first recessed portion is positioned to the first protruding portion.

In an embodiment of the present invention, the pivoting member comprises a support surface, and when the pivoting member pivots to the first state, the support surface is supported on one of the guide chamfers.

In an embodiment of the present invention, the positioning member is adapted to move relative to the base along a movement direction through elastic deformation of the elastic member, the pivoting member is pivotally connected to the base along a first axis, and the first axis perpendicular to the movement direction.

In an embodiment of the present invention, the pivoting member is pivotally connected to the base along a first axis, the elastic member is pressed between the positioning member and the base along a second axis, and the first axis does not intersect with the second axis.

Based on the above, in the multi-function printer and the hinge structure of the present invention, the pivoting member of the hinge structure comprises the positioning portions, and the positioning portions can be positioned to the positioning component of the hinge structure in the process of closing the cover toward the main body, to provide a buffering effect, so that the cover will not be directly closed to the main body at a speed that does not allow the user to react, thereby preventing the user's fingers from being hurt by the cover of an electronic device (such as the multi-function printer). In addition, the buffering effect can further prevent the main body of the electronic device (such as the multi-function printer) from being damaged by high-speed impact of the cover.

In order to make the aforementioned and other objectives and advantages of the present invention comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
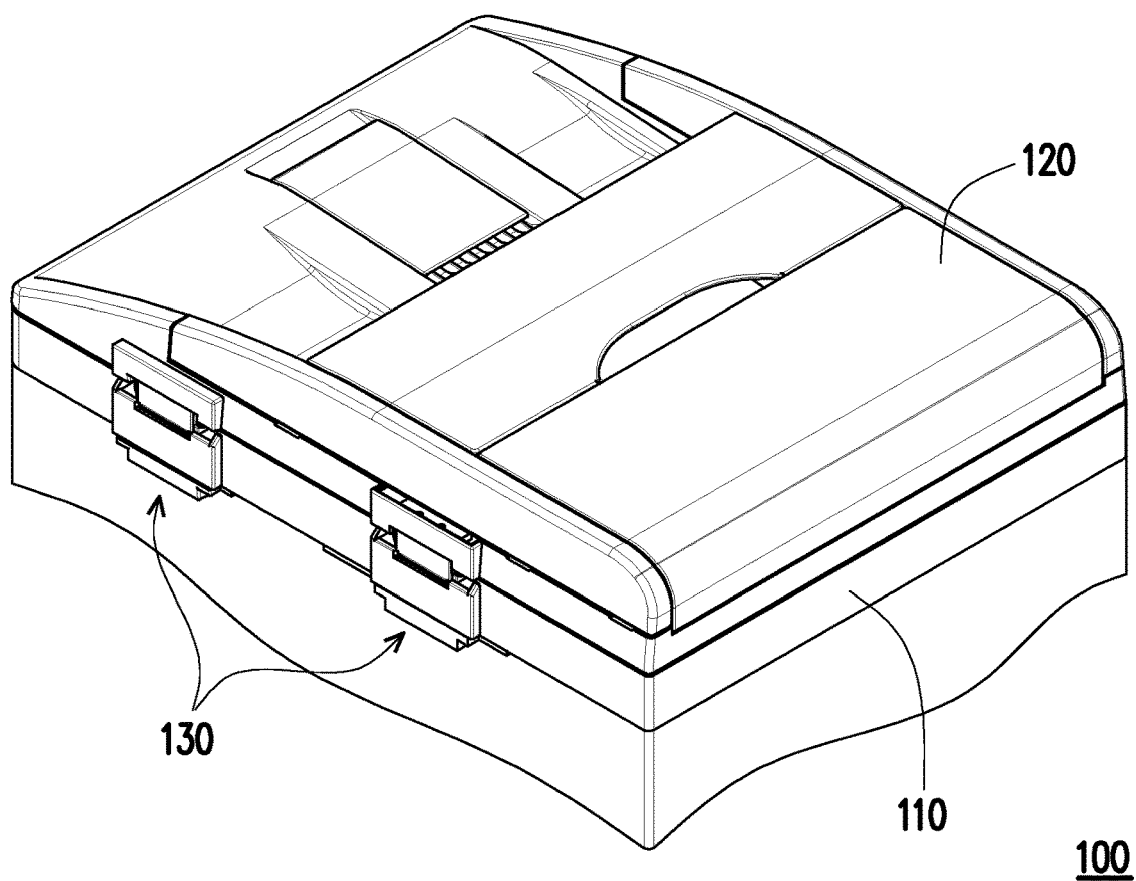
FIG. 1 is a three-dimensional diagram of a multi-function printer according to an embodiment of the present invention.

FIG. 1 is a three-dimensional diagram of a multi-function printer according to an embodiment of the present invention. Referring to FIG. 1, the multi-function printer 100 of the present embodiment comprises a main body 110, a cover 120, and at least one hinge structure 130 (two hinge structures are shown). The cover 120 is pivotally connected to the main body 110 by the hinge structures 130. A user can open the cover 120 from the main body 110, places a piece of paper on the main body 110, and then closes the cover 120 down to the main body 110 so as to implement functions such as photocopy and scanning. In other embodiments, the hinge structure 130 can be applied to other types of electronic devices.

Figure 2:
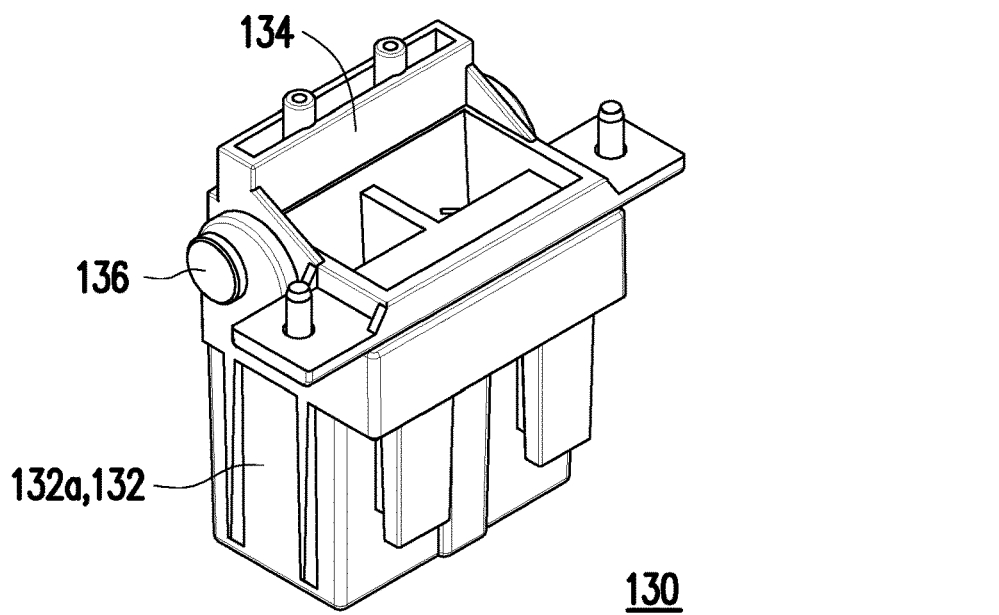
FIG. 2 is a three-dimensional diagram of a hinge structure in FIG. 1.
Figure 3:
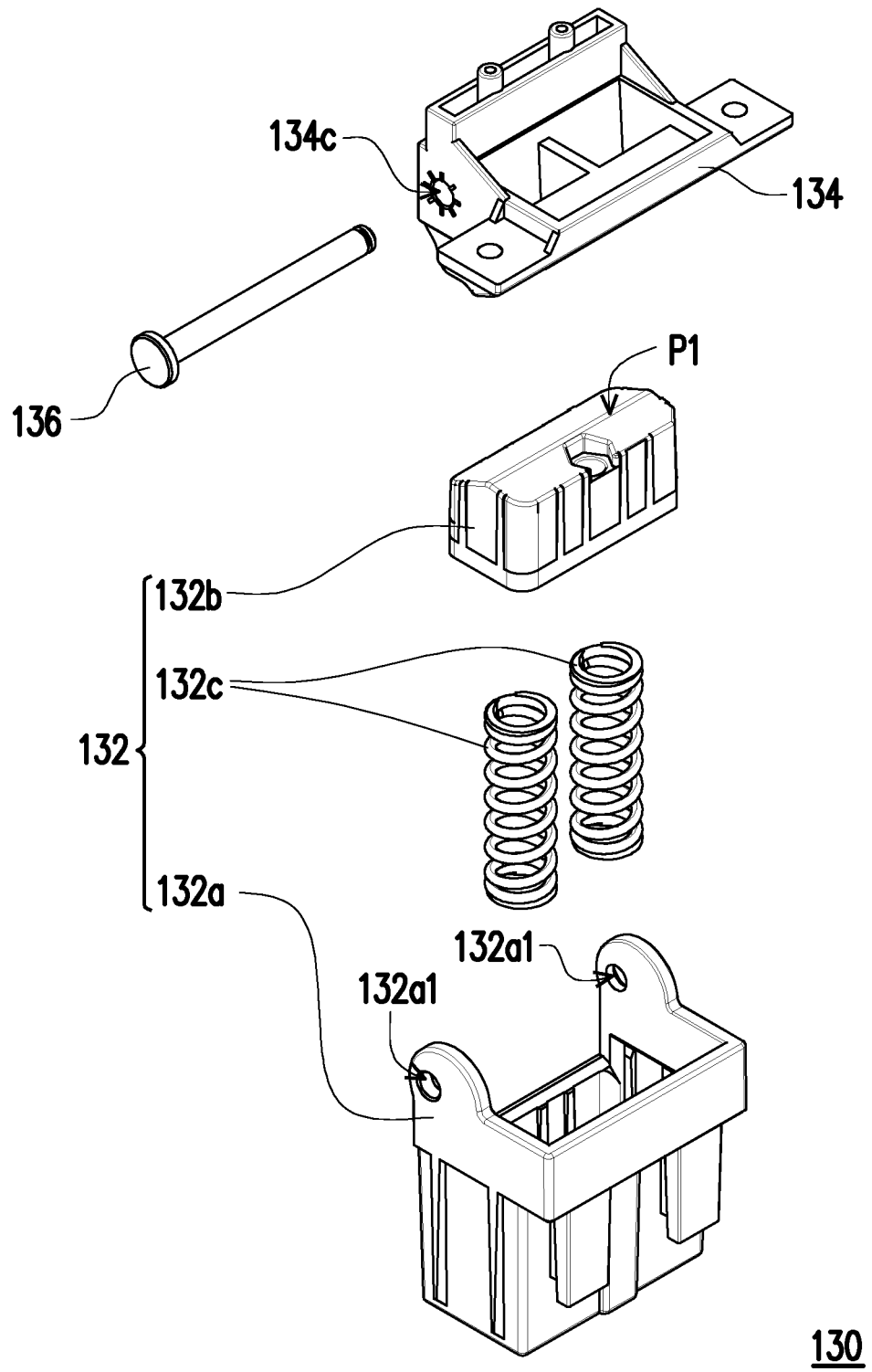
FIG. 3 is an exploded view of the hinge structure in FIG. 2.
Figure 4:
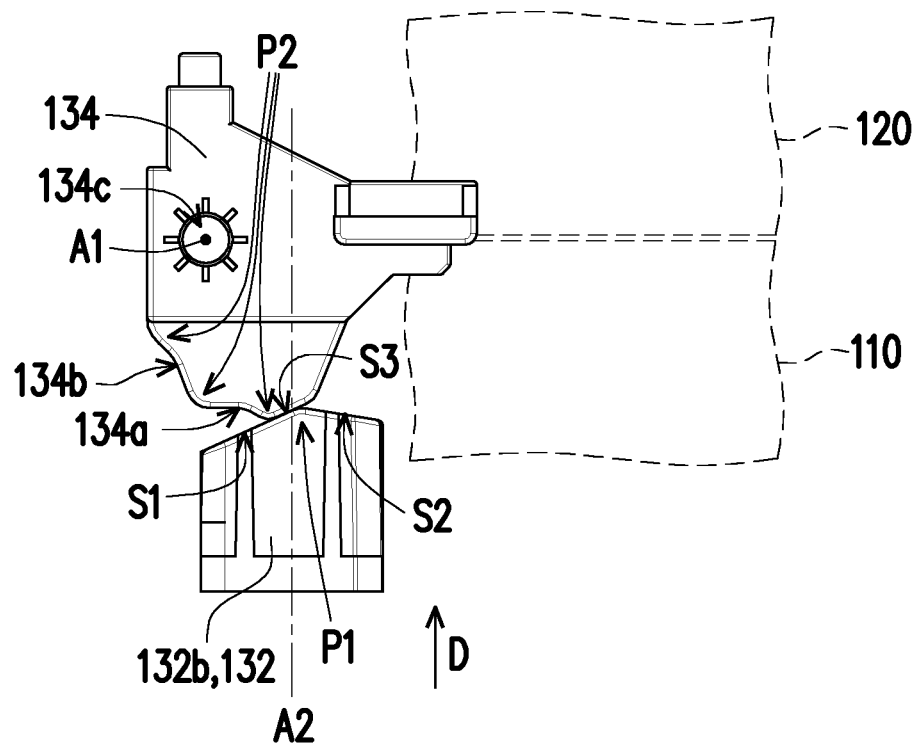
FIG. 4 is a side view of some components of the hinge structure in FIG. 2.

FIG. 2 is a three-dimensional diagram of a hinge structure in FIG. 1. FIG. 3 is an exploded view of the hinge structure in FIG. 2. FIG. 4 is a side view of some components of the hinge structure in FIG. 2. Referring to FIG. 2 to FIG. 4, the hinge structure 130 of the present embodiment comprises a positioning component 132 and a pivoting member 134. The positioning component 132 is connected to the main body 110, and the pivoting member 134 is connected to the cover 120 and is pivotally connected to the positioning component 132, so that the cover 120 can be closed on the main body 110 or opened from the main body 110 along with the pivoting of the pivoting member 134 relative to the positioning component 132. Details are described below.

Figure 5A:
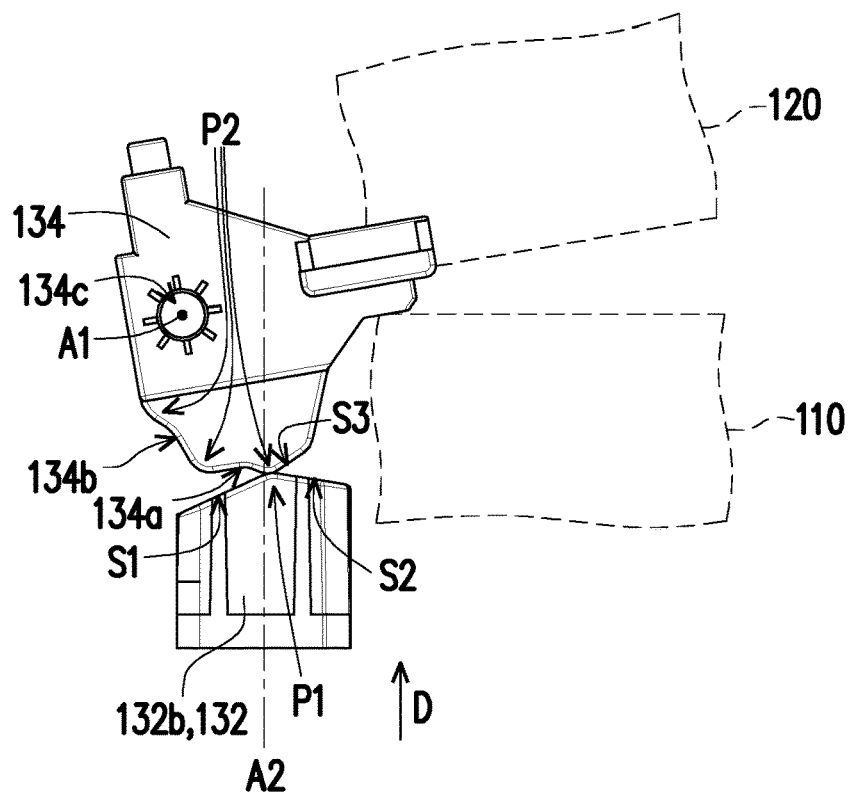
FIG. 5A to FIG. 5E illustrate a process of operation of the hinge structure in FIG. 4.
Figure 5B:
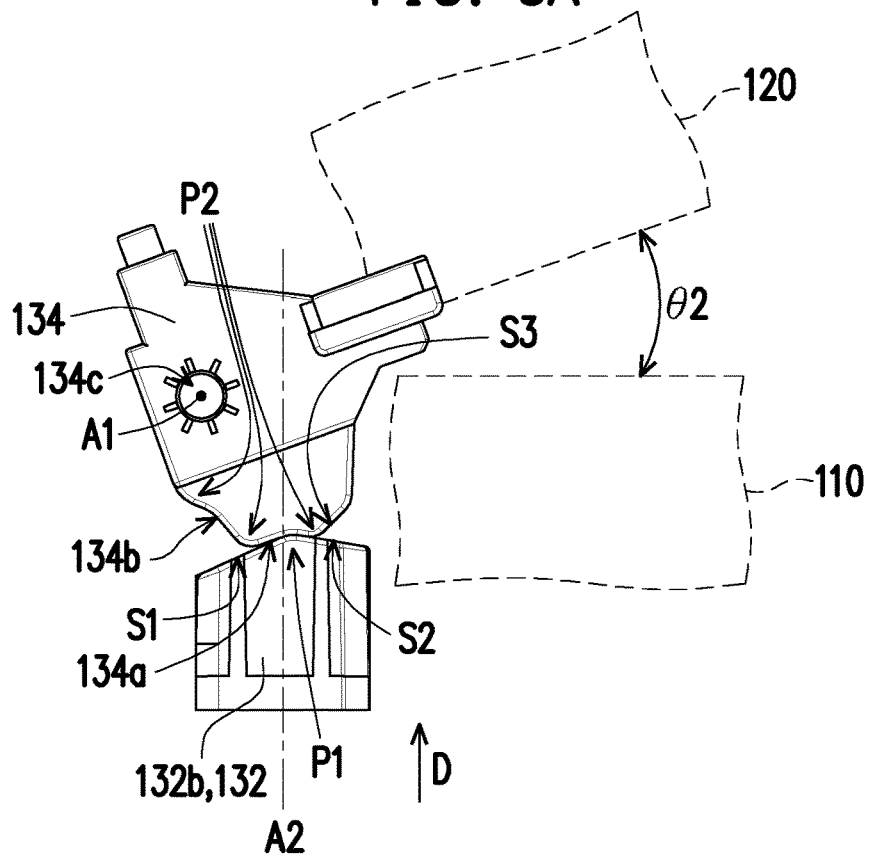
Figure 5C:
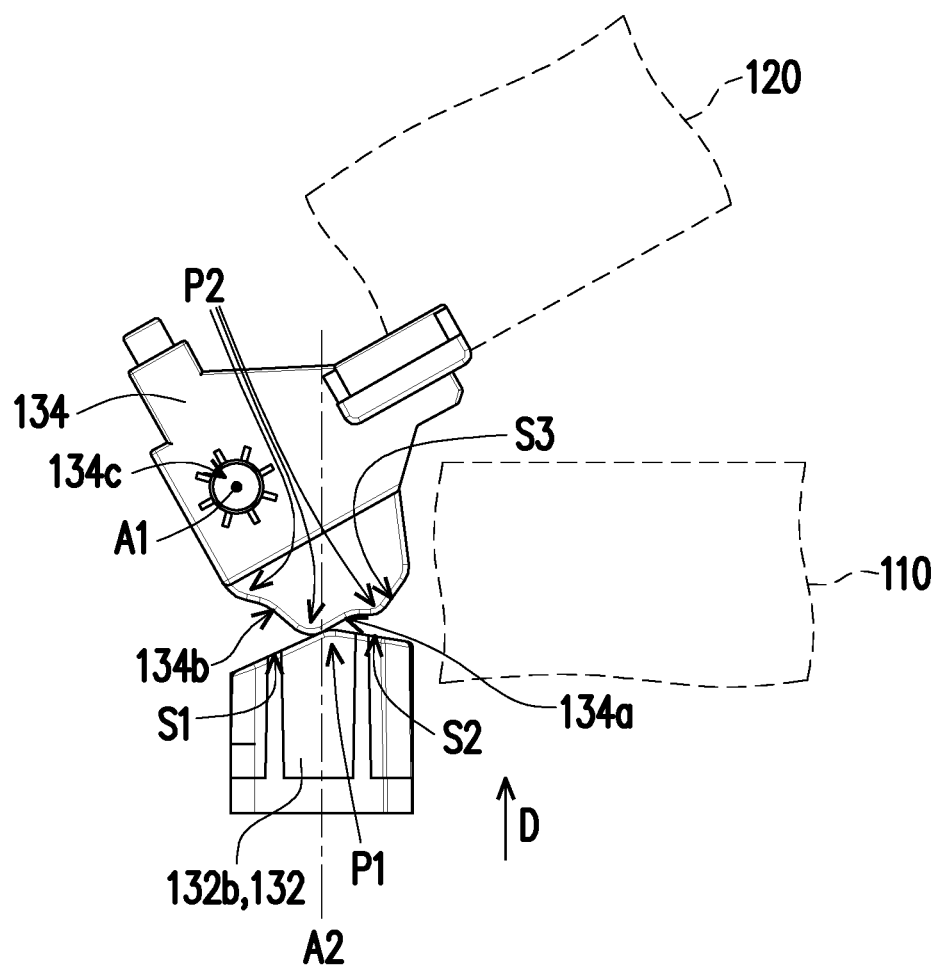
Figure 5D:
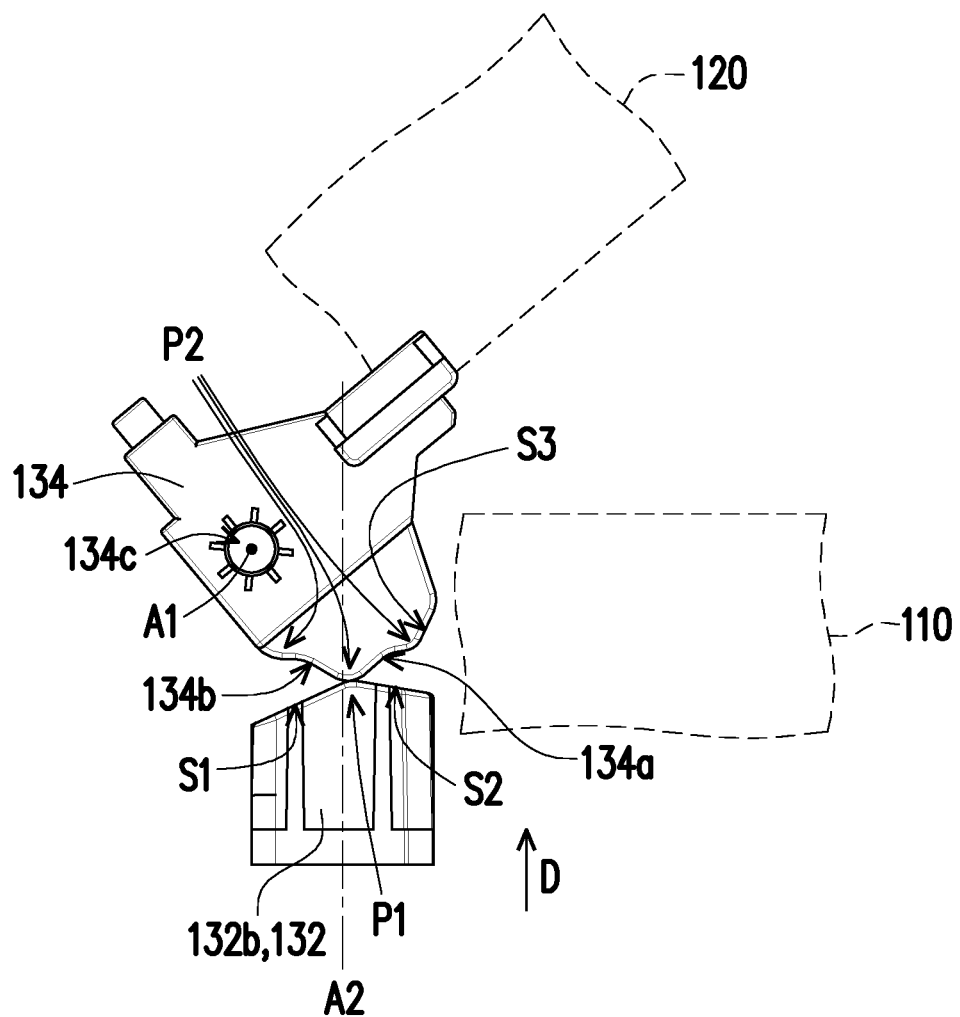
Figure 5E:
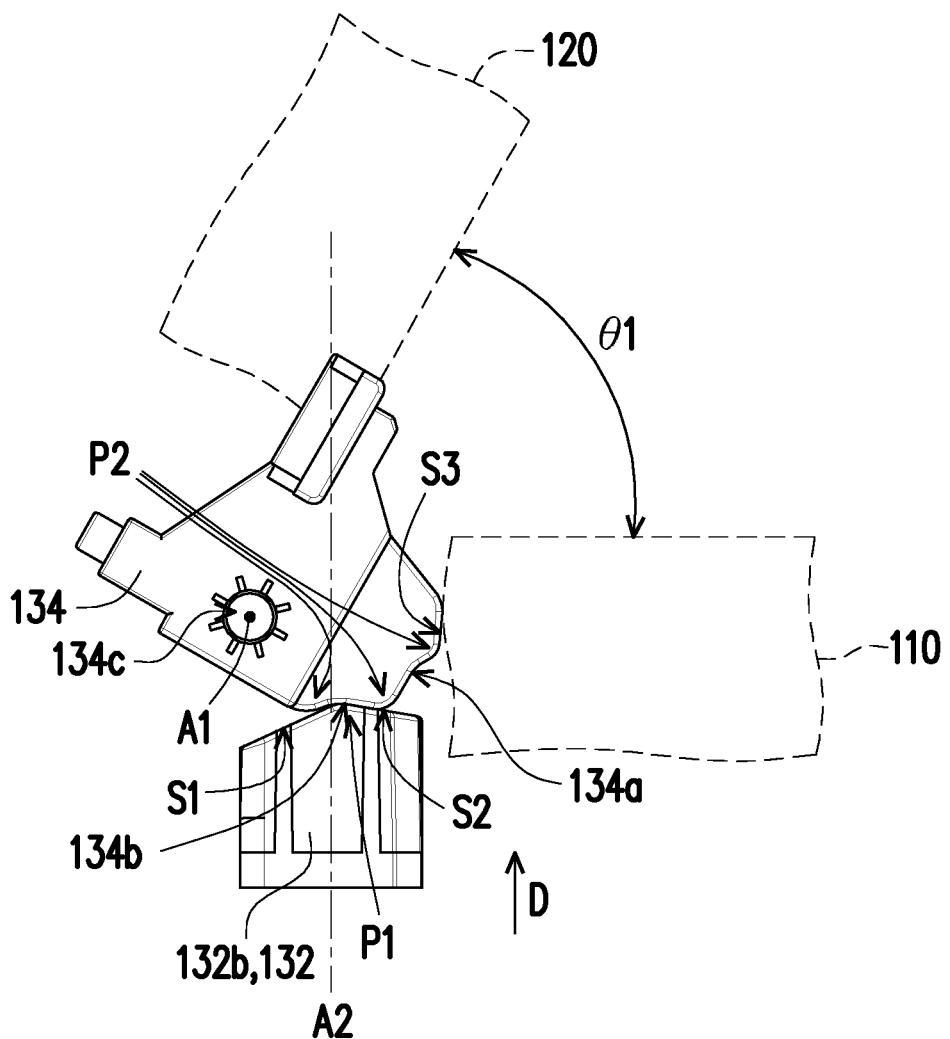

FIG. 5A to FIG. 5E illustrate a process of operation of the hinge structure in FIG. 4. FIG. 5A to FIG. 5E illustrates in sequence a process of moving the cover 120 from a closed state to a opened state, and a process of moving the cover 120 from the opened state to the closed state is illustrated in FIG. 5E to FIG. 5A in sequence. The pivoting member 134 is adapted to pivot to a first state shown in FIG. 4 so that the cover 120 is closed on the main body 110, and pivot to a second state shown in FIG. 5E so that the cover 120 is opened from the main body 110. In this case, the cover 120 is opened by a first angle θ1 relative to the main body 110. In addition, the pivoting member 134 includes at least one positioning portion (two positioning portions 134a, 134b are shown), and as shown in FIG. 5B, when the pivoting member 134 pivots to a third state between the first state and the second state, the pivoting member 134 is positioned to the positioning component 132 by the positioning portion 134a. In this case, the cover 120 is opened by a second angle θ2 relative to the main body 110. The second angle θ2 is smaller than the first angle θ1. That is to say, the positioning portion 134a of the pivoting member 134 can be positioned to the positioning component 132 as shown in FIG. 5B in the process of closing the cover 120 toward the main body 110, to provide a buffering effect, so that the cover 120 will not be directly closed to the main body 110 at a speed that does not allow the user to react, thereby preventing the user's fingers from being hurt by the cover 120 of the multi-function printer 100. In addition, the buffering effect can further prevent the main body 110 of the multi-function printer 100 from being damaged by high-speed impact of the cover 120.

In the present embodiment, when the pivoting member 134 pivots to the second state shown in FIG. 5E so that the cover 120 is completely opened from the main body 110, the pivoting member 134 is positioned to the positioning component 132 by the positioning portion 134b. In other embodiments, the pivoting member 134 may include more positioning portions to provide a multistage positioning effect, which is not limited in the present invention.

The positioning component 132 of the present embodiment is described below in detail. In the present embodiment, the positioning component 132 comprises a base 132a, a positioning member 132b, and at least one elastic member 132c (two elastic members are shown). The base 132a is connected to the main body 110. The pivoting member 134 is pivotally connected to the base 132a. The elastic member 132c is, for example, a compression spring connected between the base 132a and the positioning member 132b. The positioning member 132b pushes against the pivoting member 134 by an elastic force of the elastic member 132c, so that the pivoting member 134 can be stably positioned to the positioning member 132b. In addition, the hinge structure 130 comprises a pivot 136, the base 132a of the positioning component 132 comprises a first pivot hole 132a1, the pivoting member 134 comprises a second pivot hole 134c, and the pivot 136 passes through the first pivot hole 132a1 and the second pivot hole 134c to pivotally connect the pivoting member 134 to the base 132a.

The positioning portions 134a, 134b of the pivoting member 134 of the present embodiment are, for example, recessed portions (referred to as first recessed portions). The positioning member 132b comprises a first protruding portion P1. The first recessed portion (the positioning portion 134a or the positioning portion 134b) is adapted to be positioned to the first protruding portion P1 of the positioning member 132b as shown in FIG. 5B or FIG. 5E. In particular, the pivoting member 134 comprises a plurality of second protruding portions P2, the first recessed portion (the positioning portion 134a, 134b) is formed between form every neighboring two second protruding portions P2, the positioning member 132b comprises two guide chamfers S1, S2, and the first protruding portion P1 is formed at a junction between the two guide chamfers S1, S2. In addition, the pivoting member 134 of the present embodiment comprises a support surface S3, and when the pivoting member 134 pivots to the first state shown in FIG. 4, the support surface S3 of the pivoting member 134 is supported on the guide chamfer S1, so that the pivoting member 134 is stably maintained in the first state.

In the process of moving the cover 120 from the closed state to the opened state, one of the second protruding portions P2 is adapted to move along the guide chamfer S1 and cross the first protruding portion P1 as shown in FIG. 4 to FIG. 5B along with pivoting of the pivoting member 134, so that the first recessed portion (the positioning portion 134a) is positioned to the first protruding portion P1; the other second protruding portion P2 is adapted to move along the guide chamfer S1 and cross the first protruding portion P1 as shown in FIG. 5B to FIG. 5E along with pivoting of the pivoting member 134, so that the first recessed portion (the positioning portion 134b) is positioned to the first protruding portion P1. In the process of moving the cover 120 from the opened state to the closed state, one of the second protruding portions P2 is adapted to move along the guide chamfer S2 and cross the first protruding portion P1 as shown in FIG. 5E to FIG. 5B along with pivoting of the pivoting member 134, so that the first recessed portion (the positioning portion 134a) is positioned to the first protruding portion P1. Then, the other second protruding portion P2 is adapted to move along the guide chamfer S2 and cross the first protruding portion P1 as shown in FIG. 5B to FIG. 4 along with pivoting of the pivoting member 134, so that the support surface S3 is supported on the guide chamfer S1.

In the present embodiment, the pivoting member 134 is pivotally connected to the base 132a along a first axis A1 (shown in FIG. 4), the elastic member 132c is pressed between the positioning member 132b and the base 132a along a second axis A2 (shown in FIG. 4), and the positioning member 132b is adapted to move relative to the base 132 along a movement direction D (shown in FIG. 4) parallel to the second axis A2 through elastic deformation of the elastic member 132c. The first axis A1 is, for example, perpendicular to the second axis A2 and the movement direction D.

In the present embodiment, for example, the first axis A1 does not intersect with the second axis A2. That is to say, the pivotal connection axis (the first axis A1) of the pivoting member 134 deviates from the movement axis (the second axis A2) of the elastic member 132c and the positioning member 132b. In this way, when applying a force to pivot the pivoting member 134, the user can easily overcome the elastic force of the elastic member 132c to drive the pivoting member 134 and the positioning member 132b to move by using an arm of force between the first axis A1 and the second axis A2.

In conclusion, in the multi-function printer and the hinge structure of the present invention, the pivoting member of the hinge structure comprises the positioning portions, and the positioning portions can be positioned to the positioning component of the hinge structure in the process of closing the cover toward the main body, to provide a buffering effect, so that the cover will not be directly closed to the main body at a speed that does not allow the user to react, thereby preventing the user's fingers from being hurt by the cover of an electronic device (such as the multi-function printer). In addition, the buffering effect can further prevent the main body of the electronic device (such as the multi-function printer) from being damaged by high-speed impact of the cover. Moreover, the hinge structure is a simple structure formed by the pivoting member and the positioning component, and therefore can reduce manufacturing costs and is easy to repair.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A multi-function printer, comprising:
   a main body;
   a cover; and
   a hinge structure, comprising:
      a positioning component, connected to the main body; and
      a pivoting member, connected to the cover and pivotally connected to the positioning component, wherein the pivoting member is adapted to pivot to a first state so that the cover is closed on the main body and pivot to a second state so that the cover is opened from the main body,
      the pivoting member comprises at least one positioning portion, and when the pivoting member pivots to a third state between the first state and the second state, the pivoting member is positioned to the positioning component by the at least one positioning portion,
      wherein the positioning component comprises a base, a positioning member, and an elastic member, wherein the base is connected to the main body, the pivoting member is pivotally connected to the base, the elastic member is connected between the base and the positioning member, and the positioning member pushes against the pivoting member by an elastic force of the elastic member, wherein the at least one positioning portion comprises at least one first recessed portion, the positioning member comprises only one first protruding portion, and the at least one first recessed portion is adapted to be positioned to the only one first protruding portion, wherein the pivoting member comprises two second protruding portions, the first recessed portion is formed between the two second protruding portions, the positioning member comprises two guide chamfers, the first protruding portion is formed at a junction between the two guide chamfers, and each of the second protruding portions is adapted to move along one of the guide chamfers and cross the first protruding portion along with pivoting of the pivoting member, so that the at least one first recessed portion is positioned to the only one first protruding portion, wherein the pivoting member comprises a support surface, and when the pivoting member pivots to the first state, the support surface is only supported on a single one of the guide chamfers.

2. The multi-function printer according to claim 1, wherein when the pivoting member pivots to the second state, the cover is opened by a first angle relative to the main body, and when the pivoting member pivots to the third state, the cover is opened by a second angle relative to the main body, wherein the second angle is smaller than the first angle.

3. The multi-function printer according to claim 1, wherein the at least one positioning portion comprises two positioning portions, wherein when the pivoting member pivots to the third state, the pivoting member is positioned to the positioning component by one of the positioning portions, and when the pivoting member pivots to the second state, the pivoting member is positioned to the positioning component by the other positioning portion.

4. The multi-function printer according to claim 1, wherein the hinge structure comprises a pivot, the base comprises a first pivot hole, the pivoting member comprises a second pivot hole, and the pivot passes through the first pivot hole and the second pivot hole to pivotally connect the pivoting member to the base.

5. The multi-function printer according to claim 1, wherein the positioning member is adapted to move relative to the base along a movement direction through elastic deformation of the elastic member, the pivoting member is pivotally connected to the base along a first axis, and the first axis perpendicular to the movement direction.

6. The multi-function printer according to claim 1, wherein the pivoting member is pivotally connected to the base along a first axis, the elastic member is pressed between the positioning member and the base along a second axis, and the first axis does not intersect with the second axis.

7. A hinge structure, applicable to an electronic device comprising a main body and a cover, the hinge structure comprising:

a positioning component, connected to the main body; and a pivoting member, connected to the cover and pivotally connected to the positioning component, wherein the pivoting member is adapted to pivot to a first state so that the cover is closed on the main body and pivot to a second state so that the cover is opened from the main body, the pivoting member comprises at least one positioning portion, and when the pivoting member pivots to a third state between the first state and the second state, the pivoting member is positioned to the positioning component by the at least one positioning portion, wherein the positioning component comprises a base, a positioning member, and an elastic member, wherein the base is connected to the main body, the pivoting member is pivotally connected to the base, the elastic member is connected between the base and the positioning member, and the positioning member pushes against the pivoting member by an elastic force of the elastic member, wherein the at least one positioning portion comprises at least one first recessed portion, the positioning member comprises only one first protruding portion, and the at least one first recessed portion is adapted to be positioned to the only one first protruding portion, wherein the pivoting member comprises two second protruding portions, the first recessed portion is formed between the two second protruding portions, the positioning member comprises two guide chamfers, the first protruding portion is formed at a junction between the two guide chamfers, and each of the second protruding portions is adapted to move along one of the guide chamfers and cross the first protruding portion along with pivoting of the pivoting member, so that the at least one first recessed portion is positioned to the only one first protruding portion, wherein the pivoting member comprises a support surface, and when the pivoting member pivots to the first state, the support surface is only supported on a single one of the guide chamfers.

8. The hinge structure according to claim 7, wherein when the pivoting member pivots to the second state, the cover is opened by a first angle relative to the main body, and when the pivoting member pivots to the third state, the cover is opened by a second angle relative to the main body, wherein the second angle is smaller than the first angle.

9. The hinge structure according to claim 7, wherein the at least one positioning portion comprises two positioning portions, wherein when the pivoting member pivots to the third state, the pivoting member is positioned to the positioning component by one of the positioning portions, and when the pivoting member pivots to the second state, the pivoting member is positioned to the positioning component by the other positioning portion.

10. The hinge structure according to claim 7, wherein the hinge structure comprises a pivot, the base comprises a first pivot hole, the pivoting member comprises a second pivot hole, and the pivot passes through the first pivot hole and the second pivot hole to pivotally connect the pivoting member to the base.

11. The hinge structure according to claim 7, wherein the positioning member is adapted to move relative to the base along a movement direction through elastic deformation of the elastic member, the pivoting member is pivotally connected to the base along a first axis, and the first axis perpendicular to the movement direction.

12. The hinge structure according to claim 7, wherein the pivoting member is pivotally connected to the base along a first axis, the elastic member is pressed between the positioning member and the base along a second axis, and the first axis does not intersect with the second axis.

* * * * *